United States Patent [19]
Chen et al.

[11] Patent Number: 6,052,805
[45] Date of Patent: Apr. 18, 2000

[54] DUAL SPEED HUB, AND THE RELATED REDUNDANT SWITCHING METHOD

[75] Inventors: Mei-Yi Chen; Wei-Hung Tsai; Tien-Hsiung Tung; Pao-Ching Hu; Fang Yu; Hsiu-Chu Tsao; Mei-Chuan Chen, all of Hsinchu, Taiwan

[73] Assignee: D-Link Corporation, Hsinchu, Taiwan

[21] Appl. No.: 09/127,787

[22] Filed: Aug. 3, 1998

[51] Int. Cl.[7] ............................. G01R 29/00; H02H 3/05
[52] U.S. Cl. ............................... 714/712; 714/43; 379/15
[58] Field of Search ......................... 714/712, 43, 55, 714/56, 4; 379/15; 370/244, 242, 241, 229, 233

[56] References Cited

U.S. PATENT DOCUMENTS

| | | | |
|---|---|---|---|
| 5,436,960 | 7/1995 | Campana, Jr. et al. | 455/412 |
| 5,701,305 | 12/1997 | Albrecht | 714/712 |
| 5,862,145 | 1/1999 | Grossman et al. | 371/5.1 |
| 5,923,673 | 7/1999 | Henrikson | 714/712 |

*Primary Examiner*—Christine Trinh L. Tu
*Attorney, Agent, or Firm*—Bacon & Thomas, PLLC

[57] ABSTRACT

A dual speed hub includes a CPU, two hubs of different transmission speeds, two MACs (media access controls), and a switch, wherein the CPU periodically sends a test packet in proper order through one MAC, one hub, the switch and the other hub to the other MAC, then checks the receiving condition and the content of the returned test packet, then determines the normality of the function of the switch subject to the receiving condition and the content of the returned test packet, and then provides a warning signal to a network management system when the switch is judged abnormal, informing the network manager to repair the switch.

6 Claims, 5 Drawing Sheets

6,052,805

DUAL SPEED HUB, AND THE RELATED REDUNDANT SWITCHING METHOD

BACKGROUND OF THE INVENTION

The present invention relates to a dual speed hub, and more particularly to such a dual speed hub in which a CPU (for example: RISC) periodically sends a test packet through a first MAC, a first hub, a switch and a second hub to a second MAC, then checks the receiving condition so as to determine the normality of the function of the switch, and provides a warning signal to a network management system when the switch is judged abnormal, informing the network manager to repair the switch. The invention relates also to such a dual speed hub redundant switching method.

In recent years, computer networks have been intensively used in different fields. Following the fast development of modern computer technology, the data transmission speed in networks has become more and more fast. For example, the packet transmission speed in an ethernet has been greatly improved from the early 10 Mega bit per second to the current 100 Mega bit per second. Because of quick packet transmission speed, conventional hubs of speed at 10 Mega bit per second are not practical for use in network equipment of speed at 100 Mega bit per second. In order to meet the requirement of ethernet equipment, network system suppliers must provide hubs that can simultaneously receive and transmit packet data at the speed of 10 Mega bit per second as well as at the speed of 100 Mega bit per second so that packet data can be transmitted between different networks accurately. These hubs are commonly called "dual speed hubs".

Regular dual speed hubs include two types, namely the standard dual speed hubs, and the intelligent dual speed hubs. FIG. 1 illustrates a prior art standard dual speed hub 1, which comprises a switch 11, a first hub 12 of speed at 10 Mega bit per second, and a second hub 13 of speed at 100 Mega bit per second. The first hub 12 and the second hub 13 are respectively connected to the transceivers (not shown) of a plurality of I/O ports 14 at the dual speed hub 1. When the transceiver of one I/O port 14 receives a series of packet data from a network apparatus connected thereto, it immediately detects the transmission speed of the network apparatus from which the series of packet data is received, and then transmits the received series of through the first hub 12 or the second hub 13 to another or other I/O ports 14 subject to the transmitting speed detected. Therefore, packet data can be transmitted from the network apparatus at one I/O port to the network apparatus at another I/O port through the first hub 12 or the second hub 13 by means of the control of the switch 11. FIG. 2 illustrates a prior art intelligent dual speed hub 2, which comprises a switch 21, a first hub 22 of speed at 10 Mega bit per second, a second hub 23 of speed at 100 Mega bit per second, a CPU 24, and a MAC (media access control) 25 of speed at 100 Mega bit per second. The CPU 24 reads MIB (management information base) from the chips of the hubs 22,23, and sends network management packets through the MAC 25 to network apparatus of speed at 100 Mega bit per second or through the switch 21 to network apparatus of speed at 10 Mega bit per second subject to the traffic condition in MIB.

In either of the aforesaid two types of dual speed hubs, if the switch is out of function, packet data cannot be normally transmitted between network apparatus of different transmitting speeds, and the user cannot know the malfunction of the dual speed.

Further, in a pile-up dual speed hub architecture, as shown in FIG. 3, the first hubs 32 of speed at 100 Mega bit per second and the second hubs 33 of speed at 10 Mega bit per second of the dual speed hubs 31 are respectively connected in series, and each dual speed hub 31 has a switch 34 therein for speed adjustment, enabling packet data to be accurately transmitted from one network apparatus to another. However, in this piled-up dual speed hub architecture, only one switch 34 is allowed to be started. When the switch 34 of one dual speed hub 31 is started, the switches 34 of the other dual speed hubs 31 must be turned off. If two or more switches 34 are simultaneously started, the switches 34 will form a loop, causing the network system unable to function well. Because the CPU 35 in this pile-up dual speed hub architecture is simply in charge of network management work, it cannot recognize and judge a malfunction of the switch 34 of the respective dual speed hub 31. If the started switch 34 is out of function, the user cannot know the reason of the malfunction of the system, and packet data transmitted in network apparatus at different speeds cannot be exchanged normally through the pile-up dual speed hub architecture.

SUMMARY OF THE INVENTION

The present invention has been accomplished under the circumstances in view. According to one aspect of the present invention, the dual speed hub comprises a CPU, two hubs of different transmission speeds, two MACs (media access controls), and a switch, wherein the CPU periodically sends a test packet in proper order through one MAC, one hub, the switch and the other hub to the other MAC, then checks the receiving condition and the content of the returned test packet, then determines the normality of the function of the switch subject to the receiving condition and the content of the returned test packet, and then provides a warning signal to a network management system when the switch is judged abnormal, informing the network manager to repair the switch. According to another aspect of the present invention, when the dual speed hub is piled up with other dual speed hubs of the same structure into a pile-up dual speed hub architecture and when the switch of one dual speed hub in the pile-up dual speed hub architecture is started by the respective CPU, the CPU simultaneously drives the other dual speed hubs to switch off the respective switches, and gives a warning signal to a network management system when the started switch is out of function, informing the network manager to repair the switch. According to still another aspect of the present invention, when the switch which is started is out of function, the CPU of the respective dual speed hub immediately drives one of the other dual speed hubs to switch on the related switch, enabling it to act as a redundant switch for permitting packet data to be accurately transmitted in the network between network apparatus of different transmission speeds. According to still another aspect of the present invention, the dual speed hub further comprises a counter by which the CPU calculates the length of time in which the test packet passes from one MAC through one hub, the switch and the other hub to the other MAC, then calculates the multiple of the value of the length of time calculated over the length of time in which the test packet passes through the same path when there in no traffic in it, so that the multiple thus obtained is used as a reference value for estimating the traffic condition in the network.

DETAILED DESCRIPTION OF THE PREFERRED EMBODIMENT

Figure 1:
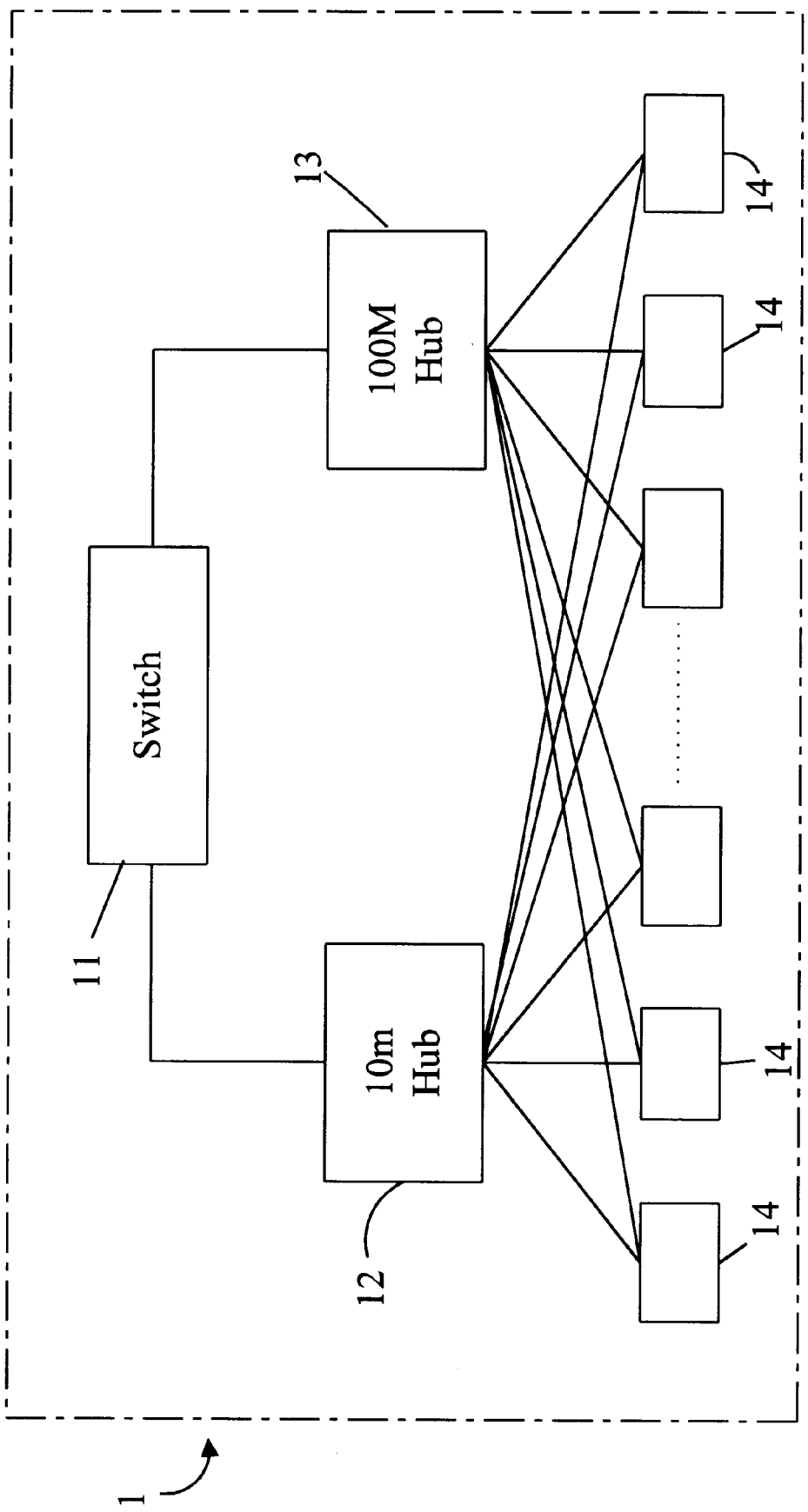
FIG. 1 illustrates the architecture of a standard dual speed hub according to the prior art.
Figure 2:
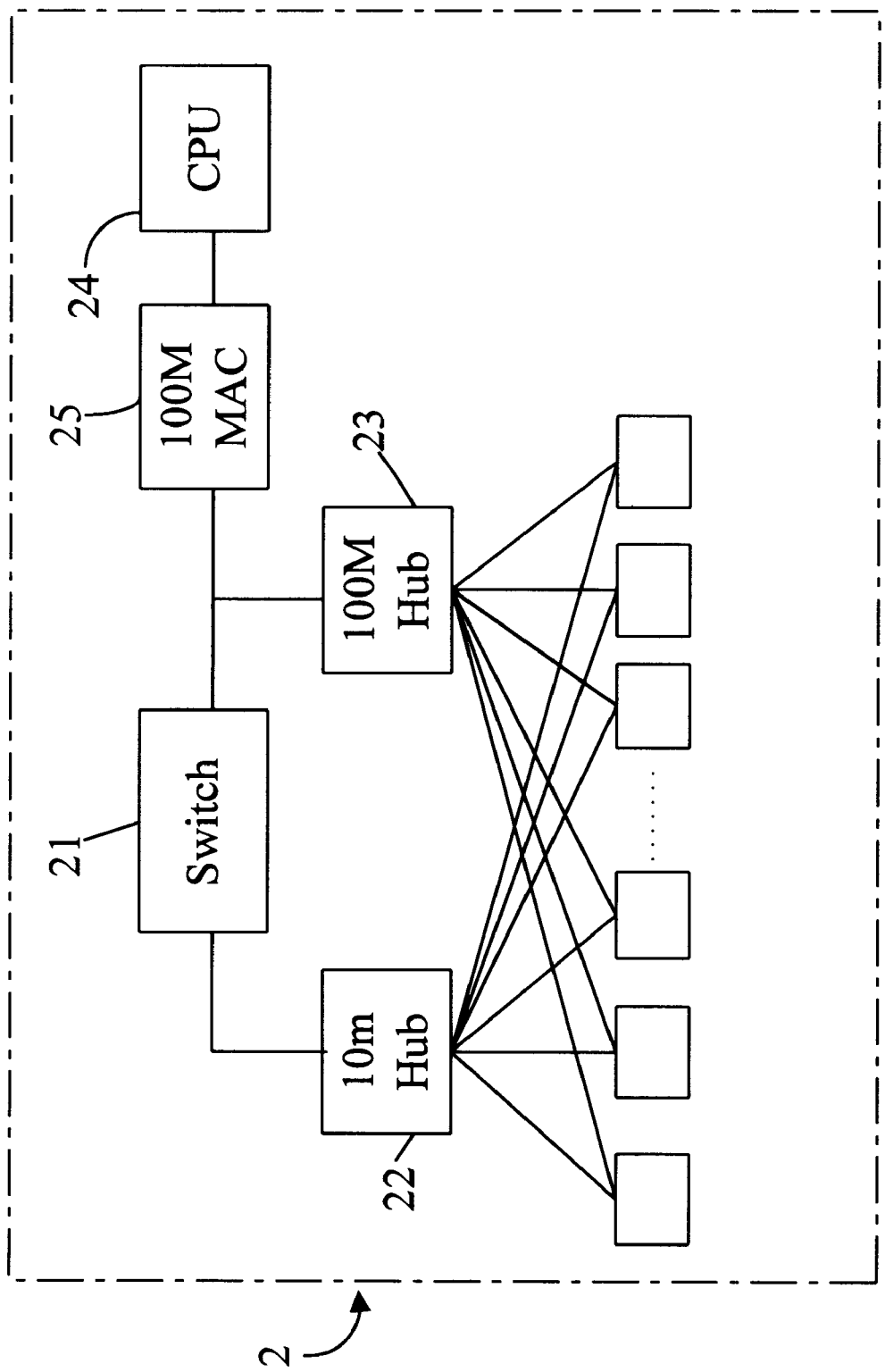
FIG. 2 illustrates the architecture of an intelligent dual speed hub according to the prior art.
Figure 3:
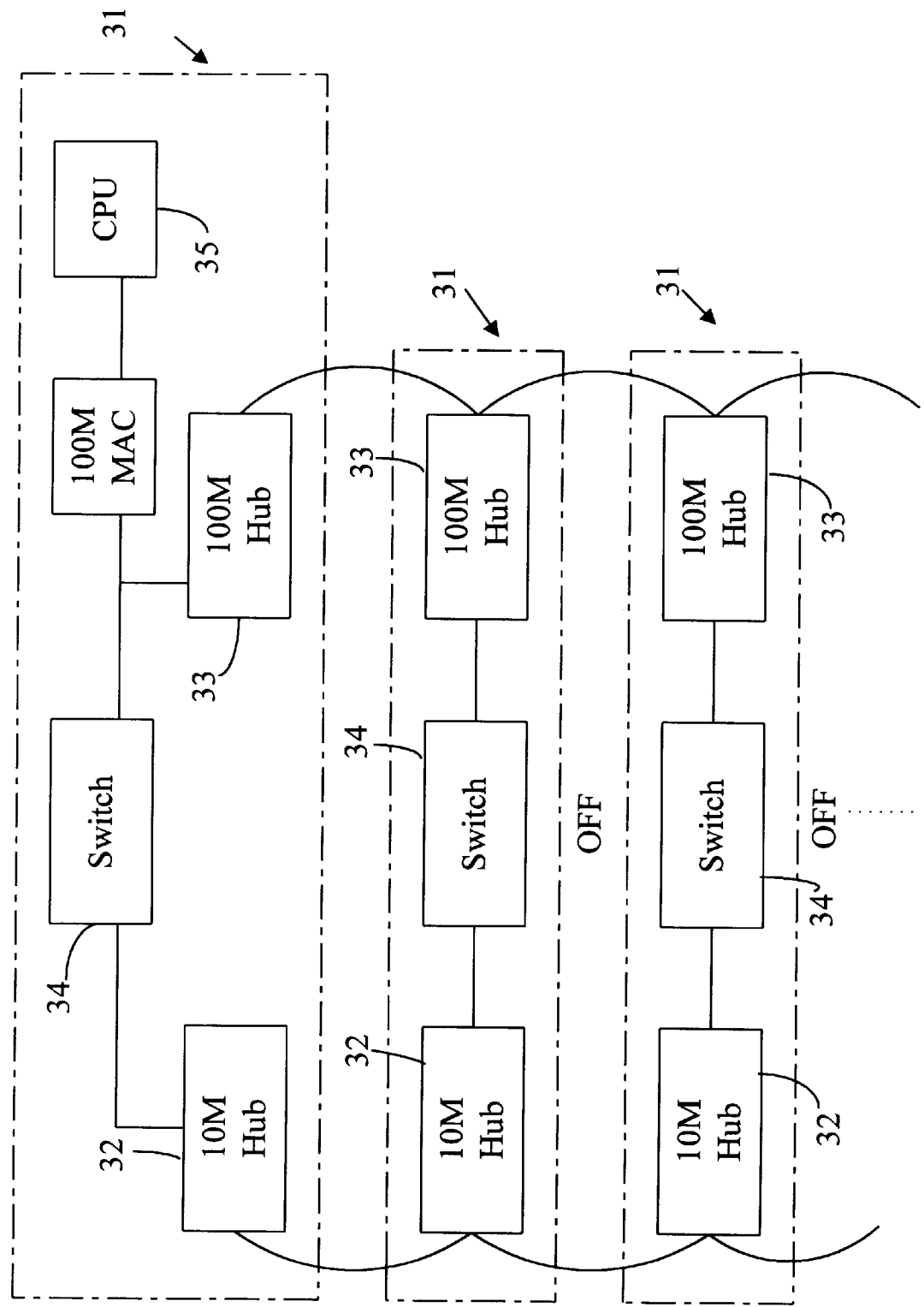
FIG. 3 illustrates a pile-up dual speed hub architecture.
Figure 4:
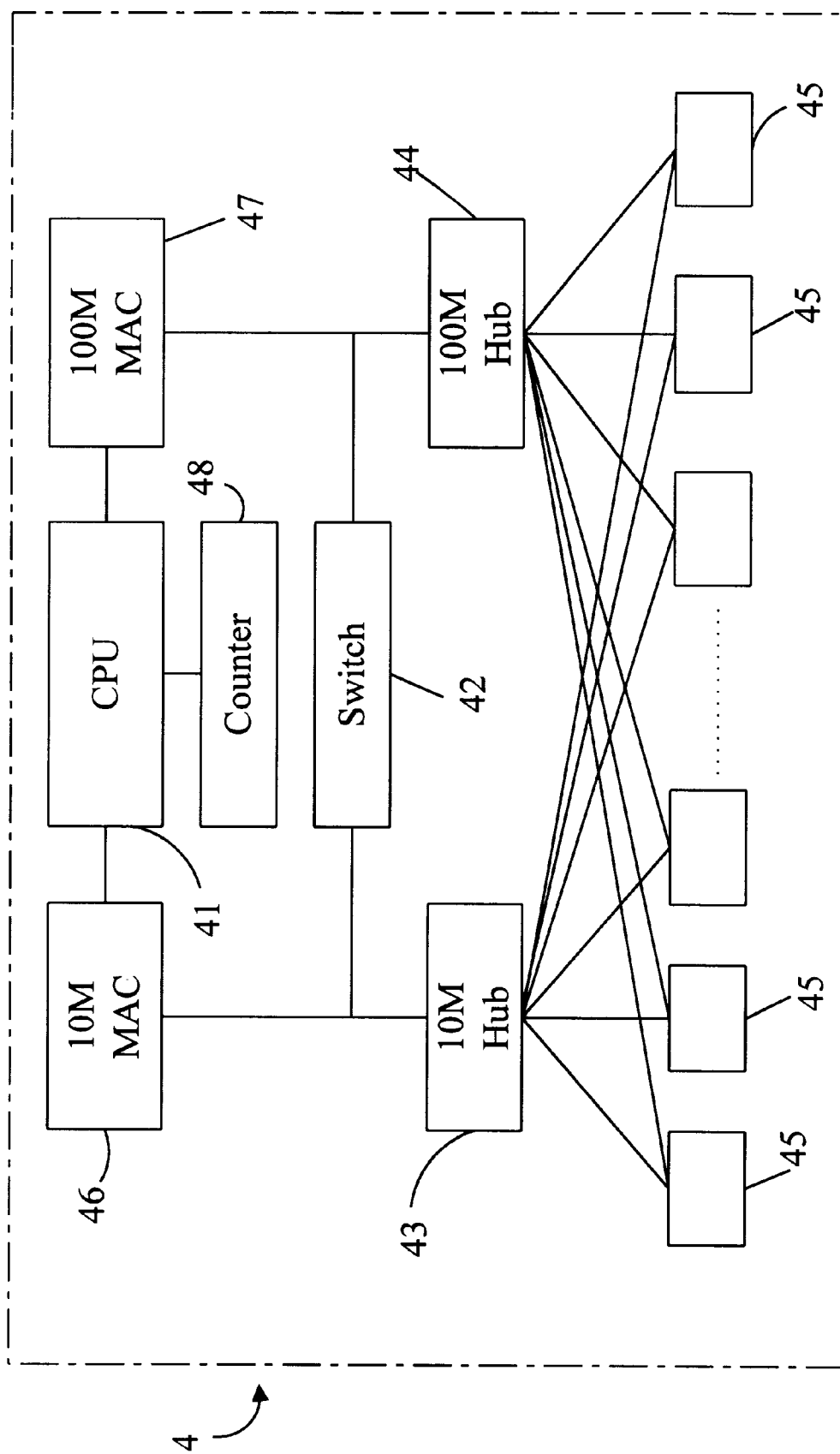
FIG. 4 illustrates the architecture of a redundant switch type dual speed hub according to the present invention.

Referring to FIG. 4, a redundant switch type dual speed hub 4 is shown comprised of a CPU 41 (for example: RISC), a switch 42, a first hub 43, and a second hub 44. The first hub 43 is for transmitting data at a first speed for example at the speed of 10 Mega bit per second. The second hub 44 is for transmitting data at a second speed for example at the speed of 100 Mega bit per second. The first hub 43 and the second hub 44 are respectively connected to the transceivers (not shown) of a plurality of I/O ports 45 at the dual speed hut 4. When the transceiver of one I/O port 45 receives a series of packet data from a network apparatus connected thereto, it immediately detects the transmission speed of the network apparatus from which the series of packet data is received, and then transmits the received series of through the first hub 43 or the second hub 44 to another or other I/O ports 45 subject to the transmitting speed detected. Therefore, packet data can be transmitted from the network apparatus of a first transmitting speed at one I/O port to the network apparatus of a second transmitting speed at another I/O port through the first hub 43 or the second hub 44 by means of the control of the switch 42.

The dual speed hub 4 further comprises a first MAC 46 of a first transmitting speed for example the speed of 10 Mega bit per second, and a second MAC 47 of a second transmitting speed for example the speed of 100 Mega bit per second. The CPI 41 is connected to the hubs 43,44 through the first MAC 46 and the second MAC 47, therefore the CPU 41 can read in MIB (management information base) from the chips of the hubs 43,44, and then transmit network management packets to the corresponding network apparatus through the first MAC 46 or the second MAC 47 subject to the network traffic condition in the MIB.

The dual speed hub 4 further comprises a counter 48 (the counter 48 can be directly installed in the CPU 41). Through the counter 48, the CPU 41 periodically sends a test packet in proper order through the first MAC 46 (or the second MAC 47), the first hub 43 (or the second hub 44), the switch 42 and the second hub 44 (or the first hub 43) to the second MAC 47 (or the first MAC 46). By checking the receiving condition and the content of the test packet at the second MAC 47 (or the first MAC 46), the normality of the function of the switch 42 is judged. If the switch is judged abnormal, the CPU 41 immediately provides a warning signal to the network management system, informing the network manager to repair the switch 42. By means of the counter 48, the CPU 41 calculates the length of time in which the test packet passes from one MAC through one hub, the switch and the other hub to the other MAC, then calculates the multiple of the value of the length of time calculated over the length of time in which the test packet passes through the same path when there in no traffic in it. The multiple thus obtained is used as a reference value for estimating the traffic condition in the network.

Figure 5:
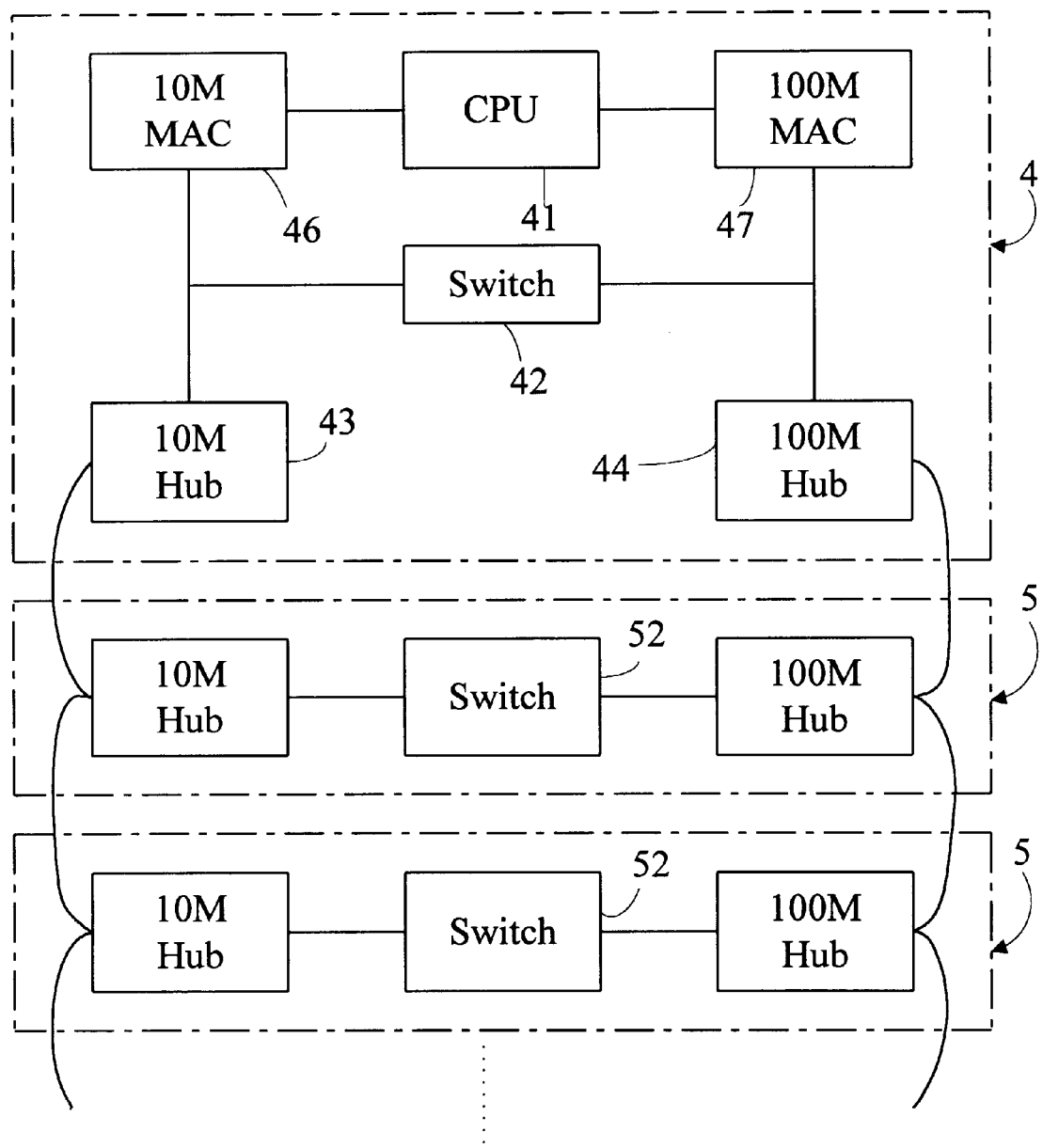
FIG. 5 illustrates a pile-up dual speed hub architecture according to the present invention.

Further, in a pile-up dual speed hub architecture constructed according to the present invention, as shown in FIG. 5, when the switch 42 of one dual speed hub 4 is started by the respective CPU 41, the CPU 41 of the dual speed hub 4 simultaneously drives the other dual speed hubs 5 to switch off the respective switches 52. If the switch 42 is out of function, it is immediately detected by the CPU 41, and the CPU 41 immediately gives a warning signal to the network management system, informing the network manager to repair the switch 42, and at the same time the CPU 41 drives one of the other dual speed hubs 5 to switch on the related switch 52, enabling it to act as a redundant switch, and therefore packet data transmission job can still be normally performed.

It is to be understood that the drawings are designed for purposes of illustration only, and arc not intended as a definition of the limits and scope of the invention disclosed.

What the invention claimed is:

1. A dual speed hub comprising:
   a CPU (central processing unit) for executing and controlling normal operation of parts of the dual speed hub;
   a plurality of I/O (input/output) ports respectively connected to network apparatus in a computer network, said I/O ports each comprising a transceiver;
   a first hub connected to the transceivers of said I/O ports for transmitting packet data in the computer network at a first speed
   a second hub connected to the transceivers of said I/O ports for transmitting packet data in the computer network at a second speed;
   a first MAC (media access control) for packet data transmission at the first speed of said first hub, said first MAC connecting said first hub to said CPU;
   a second MAC (media access control) for packet data transmission at the second speed of said second hub, said second MAC connecting said second hub to said CPU; and
   a switch connected between said first hub and said second hub for packet data transmission speed adjustment, enabling packet data to be accurately transmitted in the network between network apparatus of different transmission speeds;
   wherein said CPU periodically sends a test packet in proper order through one MAC, one hub, said switch and the other hub to the other MAC, then checks the receiving condition and the content of the test packet so as to determine the normality of the function of the switch, and then provides a warning signal to a network management system when said switch is judged abnormal, informing the network manager to repair said switch.

2. The dual speed hub of claim 1 further comprising a counter by which said CPU calculates the length of time in which the test packet passes from one MAC through one hub, said switch and the other hub to the other MAC, then calculates the multiple of the value of the length of time calculated over the length of time in which the test packet passes through the same path when there in no traffic in it, so that the multiple thus obtained is used as a reference value for estimating the traffic condition in the network.

3. The dual speed hub of claim 1 which is piled up with other dual speed hubs of the same structure into a pile-up dual speed hub architecture in which when the switch of one dual speed hub is started by the respective CPU, the CPU simultaneously drives the other dual speed hubs to switch off the respective switches, and gives a warning signal to a network management system when the started switch is out of function, informing the network manager to repair the switch, and at the same time drives one of the other dual speed hubs to switch on the related switch, enabling it to act as a redundant switch for permitting packet data to be accurately transmitted in the network between network apparatus of different transmission speeds.

4. A dual speed hub redundant switching method comprising the step of driving a CPU to periodically send a test packet through a first MAC (media access control) of a first packet, a first hub of transmission speed equal to said first MAC, a switch and a second hub of a second transmission speed to a second MAC of transmission speed equal to said second hub, and the step of driving said CPU to check the receiving condition and the content of the test packet so as to determine the normality of the function of said switch.

5. The dual speed hub redundant switching method of claim 4 further comprising the step of driving said CPU to calculate, by means of a counter, the length of time in which the test packet passes from said first MAC through said first hub, said switch and said second hub to said second MAC, then to calculate the multiple of the value of the length of time calculated over the length of time in which the test packet passes through the same path when there in no traffic in it, enabling the multiple thus obtained to be used as a reference value for estimating the traffic condition in the network.

6. The dual speed hub redundant switching method of claim 5 further comprising the step of piling up the dual speed hub with other dual speed hubs of the same structure into a pile-up dual speed hub architecture, the step of letting the CPU of the dual speed hub of which the switch is started drive the other dual speed hubs to switch off the respective switches when the started switch functions, and letting the CPU of the dual speed hub of which the switch is started drive one of the other dual speed hubs to switch on the related switch for use as a redundant switch when the started switch is out of function, enabling the redundant switch to take over the job of the malfunctioned switch for permitting packet data to be transmitted in the network between network apparatus of different transmission speeds.

* * * * *